W. H. HITESHEW.
Hay Raker and Loader.

No. 82,316.  
Patented Sept. 22, 1868.

Witnesses:  
W. C. Ashkettle  
Wm. A. Morgan.

Inventor:  
W. H. Hiteshew  
per Munn & Co.  
Attorneys

United States Patent Office.

WILLIAM H. HITESHEW, OF PERRYSBURG, INDIANA.

Letters Patent No. 82,316, dated September 22, 1868.

IMPROVEMENT IN HAY-RAKERS AND LOADERS.

*The Schedule referred to in these Letters Patent and making part of the same.*

TO ALL WHOM IT MAY CONCERN:

Be it known that I, WILLIAM H. HITESHEW, of Perrysburg, in the county of Miami, and State of Indiana, have invented a new and useful Improvement in Combined Hay-Rake and Loader; and I do hereby declare that the following is a full, clear, and exact description thereof, which will enable others skilled in the art to make and use the same, reference being had to the accompanying drawings, forming part of this specification.

Similar letters of reference indicate corresponding parts.

My invention has for its object to furnish a machine, simple in construction, and effective in operation, which will collect or rake the hay, and deposit it upon the wagon, doing its work thoroughly and well.

And it consists in the construction and combination of the various parts of the machine, as hereinafter more fully described.

A are the wheels of the machine, which are rigidly attached to the axle B, so as to carry the said axle with them in their revolution.

The axle B revolves in bearings formed in or attached to the horizontal frame C. The horizontal frame C rides upon the axle B, and its forward end is connected with or attached to the rear axle or other convenient part of the wagon. D are the rake-teeth, which are made in substantially the shape shown in fig. 2, that is to say, with short downwardly-projecting arm $d'$ upon the lower part of their rear sides, in the slotted lower ends of which arms are pivoted small wheels, E, upon which the said rake-teeth ride, so that their points may be held at a proper distance above the surface of the ground.

The upper ends of the shanks of the teeth D pass up through holes in the rear cross-bar of the frame C, where they are adjustably secured in place by pins passing through one or the other of the holes formed through the said shanks. F are toothed pulleys or wheels attached to the axle B, and around which pass the endless belts or chains $g^1$ of the carrier G. The endless belts or chains of the carrier G also pass over the pulleys H pivoted to arms I, attached to the forward-projecting ends of the inclined bars J, attached to the upper parts of the uprights K, the lower ends of which are secured to the side-bars of the frame C. The carrier G is formed by attaching cross-bars, $g^2$, to the endless chains or belts $g^1$, said bars $g^2$ being placed at a sufficient distance apart to prevent the hay from dropping through them. A suitable number of the bars $g^2$ is provided with teeth, $g^3$, by which the hay is caught, removed from the teeth D, carried up and deposited upon the wagon. L are inclined bars, placed parallel with and at a suitable distance above the inclined bars J, and which are attached to the upper ends of the uprights K. M is a rack, resting upon and attached to the inclined bars L, to form a spout, up which the hay is carried, and which prevents the said hay from being scattered while being carried up and deposited upon the wagon.

Figure 1:
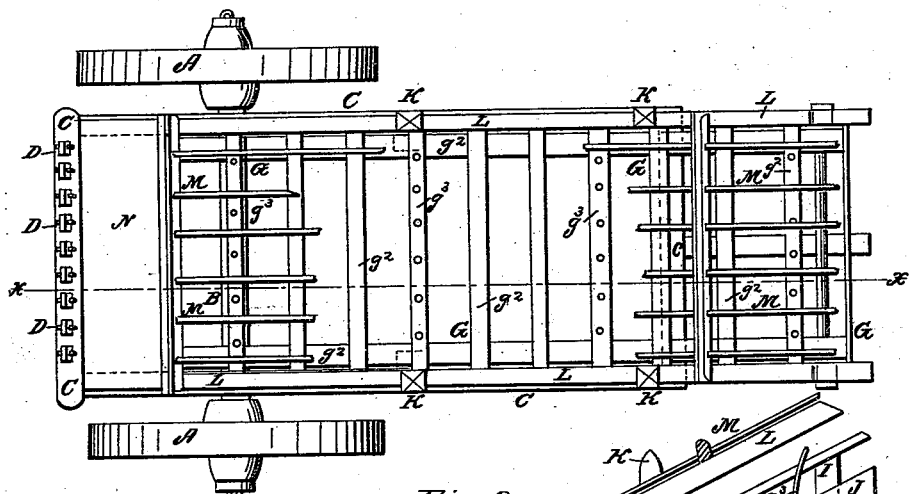
Figure 1 is a top or plan view of my improved machine.
Figure 2:
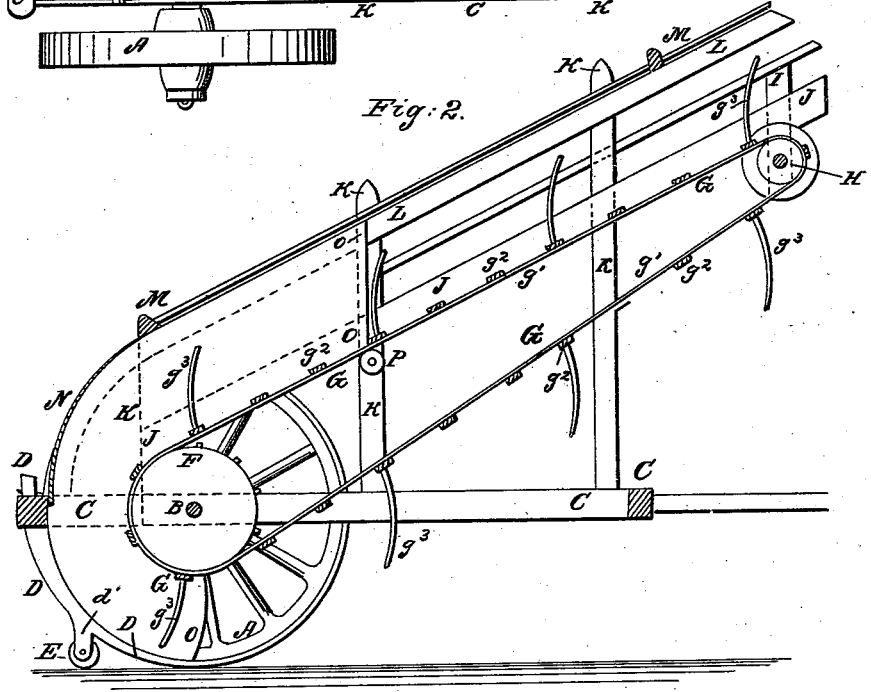
Figure 2 is a vertical longitudinal section of the same, taken through the line $x$–$x$, fig. 1.

The lower or curved part of said spout, from the rear cross-bar of the frame C up to the lower end of the rack M, is encased with a curved plate or board, N. The sides of the lower part of said spout are also encased with plates, O, of wood or metal, from the points of the teeth upward for about half the length of said spout, so as to confine the hay, and prevent clogging while passing through the curved part of said spout. The upper part of the carrier G, that supports and carries the hay, may be supported by any desired number of pulleys, P, as shown in fig. 2.

I claim as new, and desire to secure by Letters Patent—

The teeth D, constructed with arms $d'$ and wheels E, and operating substantially as herein shown and described, and for the purpose set forth.

WILLIAM H. HITESHEW.

Witnesses:
   A. W. NEFF,
   E. H. HILL.